(12) United States Patent
Shaffer et al.

(10) Patent No.: US 9,166,880 B2
(45) Date of Patent: Oct. 20, 2015

(54) DYNAMIC ADDRESS ASSIGNMENT FOR ADDRESS AGGREGATION IN LOW POWER AND LOSSY NETWORKS

(71) Applicant: Cisco Technology, Inc., San Jose, CA (US)

(72) Inventors: Shmuel Shaffer, Palo Alto, CA (US); Pascal Thubert, La Colle sur Loup (FR); Patrick Wetterwald, Mouans Sartoux (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 14/148,249

(22) Filed: Jan. 6, 2014

(65) Prior Publication Data

US 2014/0122673 A1    May 1, 2014

Related U.S. Application Data

(62) Division of application No. 12/942,979, filed on Nov. 9, 2010, now Pat. No. 8,631,101.

(51) Int. Cl.
    *G06F 15/177*      (2006.01)
    *H04L 12/24*       (2006.01)
             (Continued)

(52) U.S. Cl.
    CPC ...... *H04L 41/0816* (2013.01); *H04L 29/12254* (2013.01); *H04L 29/12273* (2013.01); *H04L 29/12933* (2013.01); *H04L 61/2038* (2013.01);
             (Continued)

(58) Field of Classification Search
    CPC ............ H04L 41/0816; H04L 61/2053; H04L 61/6068
    See application file for complete search history.

(56) References Cited

U.S. PATENT DOCUMENTS

| 6,993,034 B1 | 1/2006 | Block et al. |
| 7,925,726 B2 | 4/2011 | O Neal et al. |

(Continued)

FOREIGN PATENT DOCUMENTS

| WO | WO02076028 A1 | 9/2002 |
| WO | WO2008096912 A1 | 8/2008 |
| WO | WO2008100087 A1 | 8/2008 |

OTHER PUBLICATIONS

Invitation to Pay Additional Fees and, Where Applicable Protest Fee, including Communication Relating to the Results of the Partial International Search, mailed Feb. 9, 2012 in International Application No. PCT/US2011/059855, 6 pages.

(Continued)

*Primary Examiner* — Jonathan Bui
(74) *Attorney, Agent, or Firm* — Parker Ibrahim & Berg LLC; James M. Behmke; Stephen D. LeBarron

(57) ABSTRACT

A node in a Low power and Lossy Network (LLN) is managed by monitoring a routing configuration on a node in a LLN. A triggering parameter that is used to invoke an address change on a child node is tracked and a threshold against which to compare the triggering parameter is accessed. The triggering parameter is compared to the threshold. Based on results of comparing the triggering parameter to the threshold, it is determined that an address change at the child node is appropriate. An address change of a child node appearing in the routing configuration is invoked based on the determination that an address change is appropriate.

24 Claims, 6 Drawing Sheets

(51) Int. Cl.
  *H04L 29/12* (2006.01)
  *H04W 8/26* (2009.01)
  *H04W 40/24* (2009.01)

(52) U.S. Cl.
  CPC ........ *H04L 61/2053* (2013.01); *H04L 61/6068* (2013.01); *H04W 8/26* (2013.01); *H04W 40/248* (2013.01)

(56) References Cited

U.S. PATENT DOCUMENTS

| | | |
|---|---|---|
| 2004/0233855 A1 | 11/2004 | Gutierrez et al. |
| 2006/0248158 A1* | 11/2006 | Ha et al. ................. 709/208 |
| 2009/0006596 A1 | 1/2009 | Dinakaran et al. |
| 2009/0135793 A1 | 5/2009 | Nandagopal et al. |
| 2009/0146833 A1 | 6/2009 | Lee et al. |
| 2009/0238111 A1* | 9/2009 | Hirano et al. ................. 370/328 |
| 2009/0303931 A1 | 12/2009 | Yamauchi |
| 2010/0128624 A1 | 5/2010 | Lee et al. |
| 2011/0075666 A1* | 3/2011 | Bolan et al. ................. 370/392 |
| 2012/0155313 A1* | 6/2012 | Hirano et al. ................. 370/252 |

OTHER PUBLICATIONS

Hui et al., "IPv6 in Low-Power Wireless Networks," Proceedings of the IEEE, vol. 96, No. 11, Nov. 1, 2010, 14 pages.

Winter et al., "RPL: IPv6 Routing Protocol for Low Power and Lossy Networks draft-ietf-roll-rpl-15," Nov. 6, 2010, 144 pages.

* cited by examiner

DYNAMIC ADDRESS ASSIGNMENT FOR ADDRESS AGGREGATION IN LOW POWER AND LOSSY NETWORKS

CROSS-REFERENCE TO RELATED APPLICATIONS

This is a divisional application of U.S. application Ser. No. 12/942,979, filed Nov. 9, 2010, the entire contents of which are incorporated herein by reference.

TECHNICAL FIELD

The present disclosure generally relates to dynamic address assignment according to the routing topology in computer networks to perform route aggregation, e.g., in Low power and Lossy Networks (LLNs).

BACKGROUND

Low power and Lossy Networks (LLNs), e.g., sensor networks, can have a myriad of applications, such as Smart Grid and Smart Cities. LLNs can be designed to take into account various design issues, such as lossy links, low bandwidth, battery operation, low memory and/or processing capability, etc.

DETAILED DESCRIPTION

Figure 1A:
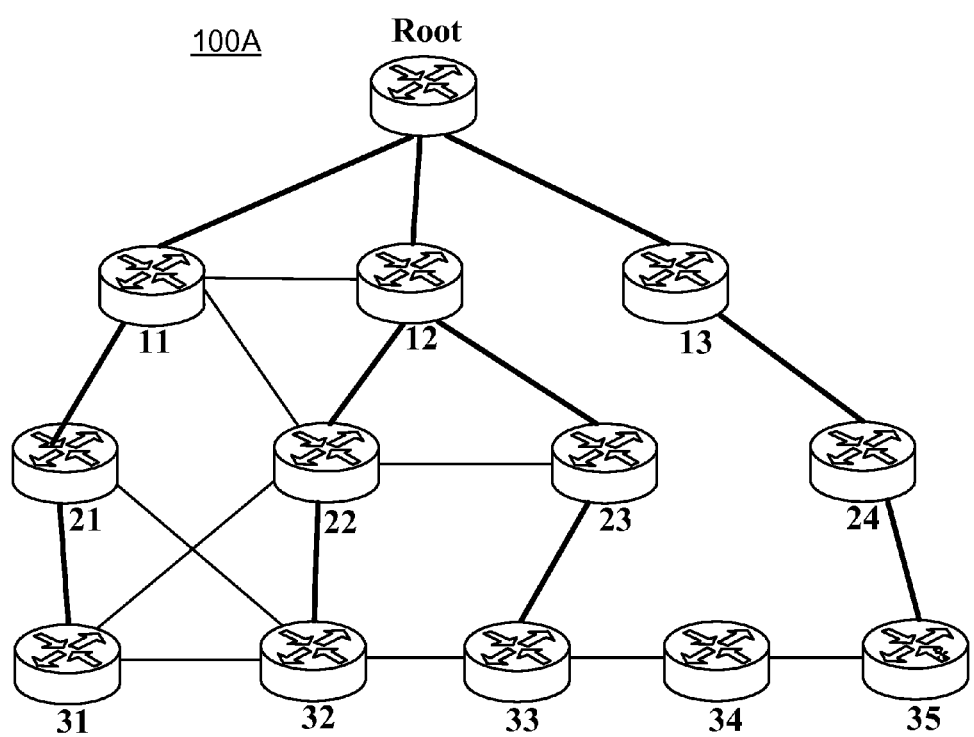
FIGS. 1A-1C show a diagram of an exemplary communications network as it undergoes routing configuration changes.

In order to manage the size of routing tables and also to manage the impact of large routing table on nodes in networks (e.g., a LLN (Low power and Lossy Networks)), a node may be configured to monitor and react to routing topology changes. For instance, by way of example, wireless nodes and wireless networks are used to illustrate disclosed techniques for managing size and impact, among other characteristics. More specifically, a wireless node can be configured to monitor and react to a routing configuration in a wireless mesh network. To this end, the wireless node may determine the amount of memory consumed by a routing table (or one or more other triggering parameter(s) like how fragmented the address space consumed by child nodes remains). The wireless node thereby tracks one or more triggering parameter(s) used to invoke an address change, generally at a child node, to a known address or address range. The triggering parameter(s) may include the memory utilization of a wireless node, the size of a routing table at the wireless node, an extent of the fragmentation within the routing table, i.e., the extent to which a child node has an address which falls outside the range of addresses assigned to a given parent, a frequency of routing reconfiguration commands, a level of processor utilization, a number of child nodes, and/or a hybrid of values that reflects competing demands for time. For example, a hybrid value may reflect thresholds for the processor utilization, the link utilization, and/or the routing table size.

The wireless node compares the triggering parameter to a threshold. For example, a wireless node may be configured to generate an alarm when the routing table consumes 80% of memory or when the routing table consumes 50% of memory and the address space for child nodes is fragmented with addresses that lie outside of a specified range by more than 30% of available memory. The wireless node determines, based on comparing the triggering parameter to the threshold, that an address reconfiguration command should be generated. The wireless node may determine that the size of the routing table exceeds more than a threshold value at which adverse network performance is determined to occur. The wireless node can then generate an address reconfiguration command. The address reconfiguration command may include a message addressed to a child node that asks the child node to change its address to a different address associated with a particular range so that the individual routing entries in the routing table can be consolidated into an entry that includes an address range for a collection of devices. It may also include a time boundary to mean that the child should change its address it is stays (or plans to stay) attached to this node for at least a certain period. It is understood that although the portions of the disclosure are illustrated using wireless nodes, it does apply to other environments including non-wireless nodes in a LLN, for example, interconnected via wired links such as PLC.

The child node receives a unicast signaling message from a parent node that includes an address reconfiguration command with a preferred prefix specifying an address that the node will assume as a result of performing address reconfiguration in response to the detected node/network condition. The address reconfiguration command may include a command instructing the child node to assume a new address within a particular range so that fewer child nodes have addresses that lie outside of a consolidated address range.

The child node then determines whether there is an active flow on the wireless node. In one implementation, an active flow represents a communications session in which the child node is an endpoint. In another configuration, the active flow represents a communications session in which the child node represents a transient node along the path between two other endpoints or between an endpoint the directed acyclic graph (DAG) root. If there's an active flow, the child node may elect to terminate the active flow and/or wait a threshold period of time to determine if the active flow ends. When possible, the node may even terminate the active flow. In one configuration, the node may wait for the active flow to conclude before reconfiguring its address. Upon terminating the active flow, the child node reconfigures itself to use a new IP address within a suggested IP prefix, in response to determining that there is the active flow on the wireless node, an address on the wireless node using the preferred prefix provided by its parent. The child node transmits an acknowledgement message to the parent node indicating that address reconfiguration has been performed, thus sending an explicit notification that the old address is no longer used.

These operations may be useful in the context of LLNs, such as those employing RPL (Routing Protocol for Low Power Devices), which is a routing protocol configured to support IP (Internet Protocol) Smart Object Networks. IP Smart Object Networks may include smart grid networks that perform a variety of tasks such as sub-station automation, smart metering, and demand-response tasks. In LLNs, links may feature low-speed interfaces and they may be associated with lossy characteristics in terms of bit/packet error rates. In some environments, LLNs may be associated with intermittent connectivity. These characteristics may be observed in out-door wireless networks, as well as PLC (Power Line Communication links, such as IEEE 61334, CPL G3, and WPC among others.

LLNs can be used for a variety of networks such as Smart Grid (e.g., smart metering), home/building automation, smart cities, and other areas where a lightweight communications interface and processor is deemed useful. LLNs can be designed to account for stability of the network. For example, the design of LLNs can take into account fast reaction/convergence to link and/or node failures in LLNs, potentially high levels of congestion due to routing packet control traffic, and dynamic routing metric changes. In one design technique, for example, metric values may be normalized and a node in the wireless network may be configured to only advertise new metrics when values exceed a threshold.

As previously noted, link bandwidth and node resources (e.g., CPU power, energy, and memory) are limited. The RPL algorithm builds a set of Directed Acyclic Graphs (DAGs) where nodes join the DAG according to objective functions and metrics. DAGs allow for upward routing from the child nodes to a DAG root. Once a node joins a DAG, it announces prefix reachability using RPL messages (called DAO (Destination Advertisement Object) messages) that travel toward the DAG root, and it also allows for routing from the root down the DAG. Note that point-to-point communications also are supported as a result of using DAO. For example, a message from node A to node B travels up the DAG until it reaches a common parent of A and B where a routing table has been populated using DAO messages, at which point the packet is routed in the down direction until it reaches the destination (node B). The process of populating a routing table using DAO messages can be referred to as the "storing node" mode where nodes construct and store routing tables.

LLNs operating in this manner also can be implemented to account for a routing table size. A wireless node may include a battery-operated system-on-a-chip with a processor and a finite amount of memory in which to store a routing table. For devices close to the DAG root, particularly where a LLN accommodates thousands of children nodes (e.g., for Advanced Metering), more storage may be required for the routing table when compared to the storage required for nodes away from the DAG root where fewer children nodes exist. Unless intelligent address schemes are employed, a node close to the root may be asked to store individual addresses of 1000s of devices. Thus, a node with a lower depth (closer to a DAG root) may be expected to operate at higher memory utilization even if optimally configured. In contrast, a node with an increased depth (further from the root node), may be able to operate in a more efficient manner, that is, with a smaller routing table with fewer nonaggregated child nodes.

In some implementations, a wireless node may employ an IP address assignment, routing, and aggregation scheme that reduces the storage and processor requirements. By employing address aggregation, for example, the complexity of the routing tables can be reduced, which may improve the scalability of protocols like RPL in LLNs.

Figure 1B:
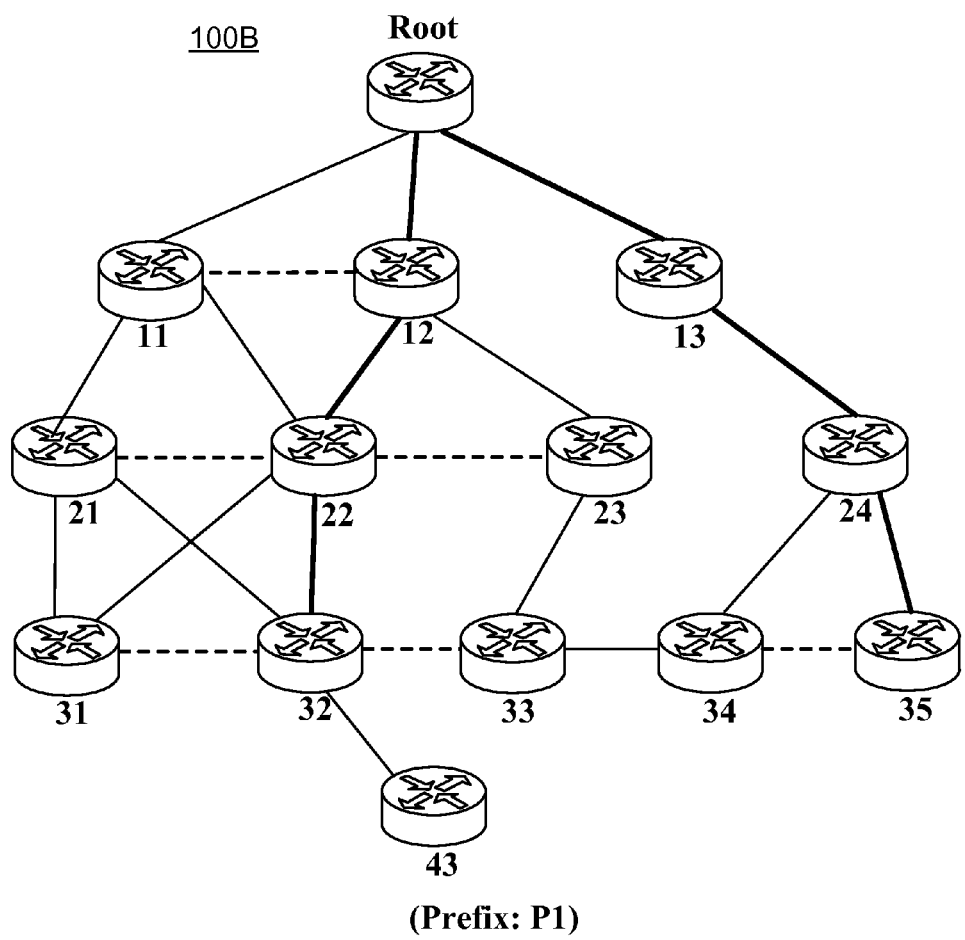
Figure 1C:
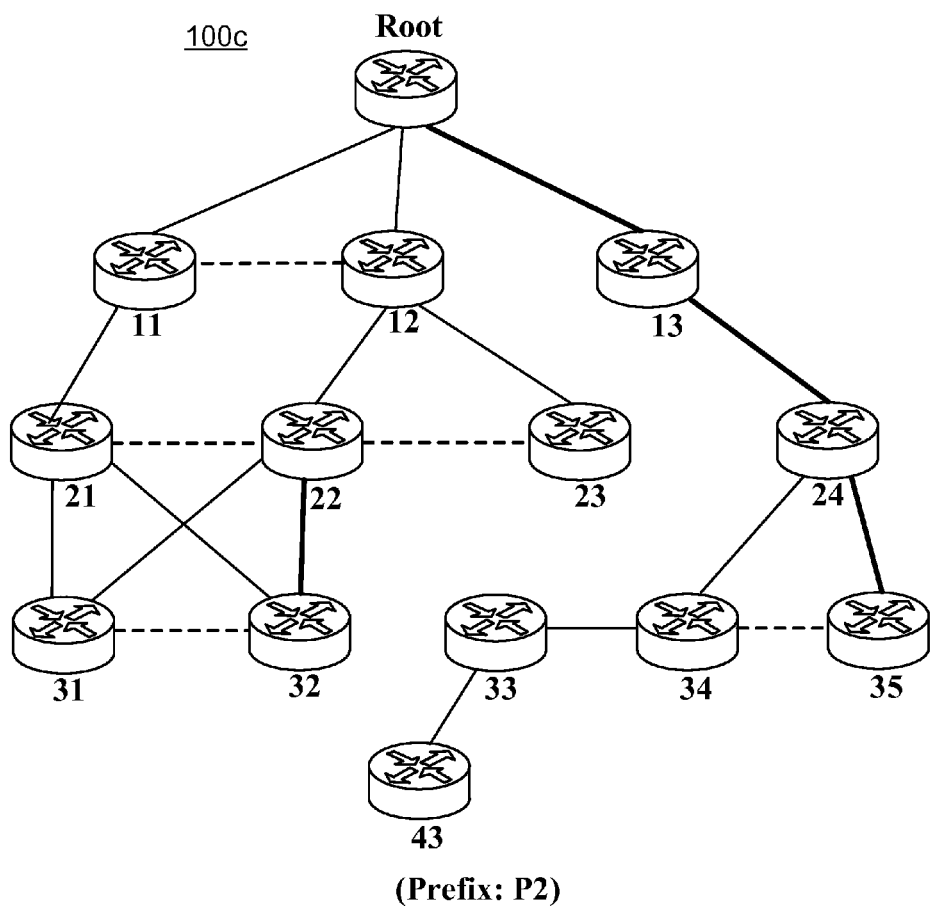

FIGS. 1A-1C show diagrams that illustrate a communications network as it undergoes routing aggregation. Initially, a wireless mesh network (e.g., a LLN) has the configuration 100A shown in FIG. 1A. Configuration 100A illustrates a DAG that has been superimposed (shown in the bold lines) over a network configuration of possible links. For example, wireless node 31 may directly access wireless nodes 21, 22, and 32, though the DAG configures wireless node 31 to directly route content through wireless node 21.

In the configuration 100B shown in FIG. 1B, wireless node 43 is initially attached to wireless node 32 with a Prefix P1. If at some point, wireless node 43 selects the wireless node 33 as its best parent (which is not an uncommon occurrence in LLNs), wireless node 43 will advertise its IP address (P1: address of node 43) to the wireless node 33. This advertisement leads to adding a new entry in the routing tables of all the nodes up to the DAG root. As a result, wireless node 13 now advertises the address (P1: address of 43) both in the UP and DOWN in the DAG, where UP represents transmission towards the DAG root and DOWN represents transmission away from the DAG root. As nodes start to move within the DAG, this topological reconfiguration may impact the ability for the nodes to perform aggregation, which may lead to a large increase of the routing table size.

FIG. 1C shows that the DAG is further reconfigured in configuration 100C. In configuration 100C, as the wireless node 33 makes wireless node 34 the parent instead of wireless node 23, wireless node 43 now has an address that falls outside of the range of aggregate range of the children of wireless node 13. Presuming that wireless node 43 was originally-addressed in an aggregate range managed by wireless node 12, wireless node 43 now has an address which lies outside of the address range of wireless node 33. Depending on the configuration of the wireless node 13, the wireless node 13 may commence a process of transmitting an address reconfiguration message to child nodes. The child nodes may in turn iteratively continue propagating the address reconfiguration message until an address reconfiguration message eventually reached wireless node 43. The reconfiguration message may include an IP unicast message addressed to wireless node 32 that includes a suggested prefix in the body of the message. The suggested prefix represents an IP address prefix (e.g., a network identifier, such as an IPv6 address that wireless node 43 should incorporate when reconfiguring itself to use a new IP address).

Note that an addressing schema may be organized so that nodes associated with a parent are assigned to a subnet belonging to and managed by the parent. For example, assume that the root node (the DAG root) has an address space SP1. For the sake of simplicity, consider a configuration where the root node has two children: node N1 and node N2. The root node then divides the address space SP1 into two address spaces SP1.1 (which is assigned to node N1) and SP1.2 which is assigned to node N2. Also please note that SP1.1 and SP1.2 are exclusive of each other and together they may occupy the whole address space SP1. In one configuration, node N1 and node N2 are assigned a subset of address space SP1, thus leaving addresses for children who may join the root as first children in the future.

Node N1 has children of its own (assume three children). The node N1 takes the address space given to it by its parent namely SP1.1 and divides it into three portions SP1.1.1, SP1.1.2, and SP1.1.3. Please note that each time this happens a node may keep portion of its address space in case another child needs to join it in the future. The process continues like this until all leaf nodes are assigned addresses which fall within the address space of their parent.

Figure 2:
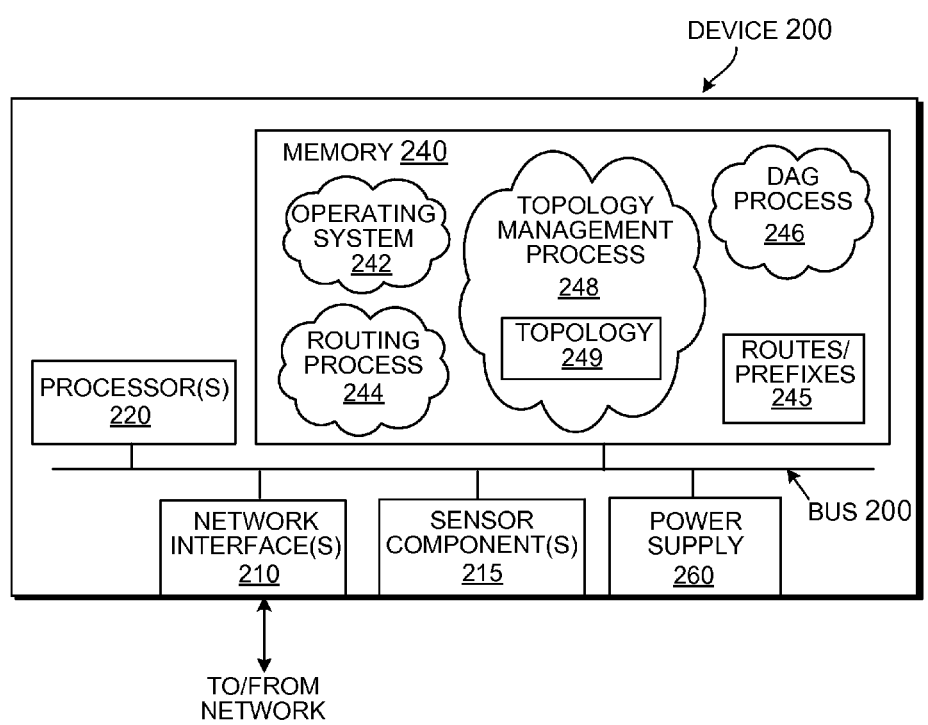
FIG. 2 shows an example of a configuration of a wireless node within a LLN, illustrating one application setting for this dynamic addressing technology.

FIG. 2 shows configuration of a wireless node within a LLN. The device 200 may include one or more network interfaces 210, one or more sensor components 215 (e.g., sensors, actuators, etc.), a processor 220 (e.g., an 8-64 bit microcontroller), and a memory 240 interconnected by a system bus 250, as well as a power supply 260 (e.g., battery, plug-in, etc.).

The network interface(s) 210 include the mechanical, electrical, and signaling circuitry for communicating data over physical and/or wireless links coupled to the network. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, Power Line Communication (PLC) protocols, etc. Note that the root may have two different types of network connections at the network interface(s) 210. For example, one or more interfaces may be used to communicate with the mesh network (into the mesh cell), e.g., the other nodes shown in FIG. 1, while another interface may be used as a WAN uplink network interface between the root node and, for example, a head-end device located through the WAN.

The memory 240 includes storage locations that are addressable by the processor(s) 220 and the network interface(s) 210 for storing software programs and data structures associated with one or more of the embodiments described herein. As noted above, certain devices may have limited memory or no memory (e.g., no memory for storage other than for programs/processes operating on the device). The processors 220 may include the elements or logic to execute the software programs and manipulate the data structures, such as routes or prefixes 245 (notably on capable devices only). Operating systems 242, portions of which are typically resident in memory 240 and executed by the processor(s), functionally organizes the device by, inter alia, invoking operations in support of software processes and/or services executing on the device. These software processes and/or services may comprise routing process/services 244, which may include a DAG 246. Also, for root devices (or other management devices), a topology management process 248 and one or more associated stored topologies 249 may also be present in memory 240, for use as described herein. Various implementations may vary from what is shown in FIG. 2. For example, other processor and memory types, including various computer-readable media, may be used to store and execute program instructions pertaining to the techniques described herein. Also, while the description illustrates various processes, various processes may be embodied as modules (or sub-modules) configured to operate in accordance with the techniques described herein (e.g., according to the functionality of a similar process).

Routing process (services) 244 can include computer executable instructions executed by the processor 220 to perform functions provided by one or more routing protocols, such as proactive or reactive routing protocols. These functions may, on devices capable of such functions, be configured to manage a routing/forwarding table 245 containing, e.g., data used to make routing/forwarding decisions. In particular, in proactive routing, connectivity can be discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, can discover neighbors (i.e., does not have an a priori knowledge of network topology), and in response to a needed route to a destination, can send a route request into the network to determine which neighboring node may be used to reach the desired destination. Examples of reactive routing protocols may include Ad-hoc On-demand Distance Vector (AODV), Dynamic Source Routing (DSR), DYnamic MANET On-demand Routing (DYMO), etc. For devices not capable or configured to store routing entries, the routing process 244 may only involve providing the required mechanisms for source routing techniques. That is, for source routing, other devices in the network can tell the less capable devices exactly where the less capable devices should send the packets, and the less capable devices can simply forward the packets as directed.

Low power and Lossy Networks (LLNs), e.g., certain sensor networks, may be used in a myriad of applications such as for "Smart Grid" and "Smart Cities." A number of design considerations in LLNs can be taken into account, such as:

1) Links generally may be lossy, such that a Packet Delivery Rate/Ratio (PDR) can vary due to various sources of interferences;

2) Links generally can have a low bandwidth, such that control plane traffic generally may be bounded and deemed negligible compared to the low rate data traffic;

3) There are a number of use cases that may have a requirement for specifying a set of link and node metrics, some of them being dynamic, thus requiring specific smoothing functions to avoid routing instability;

4) Constraint-routing may be required by some applications;

5) Scale of the networks may become very large, e.g., on the order of several thousands to millions of nodes; and/or 6) Nodes may be constrained with a low memory, a reduced processing capability, a low power supply (e.g., battery).

In other words, LLNs may be considered as a class of network in which both the routers and their interconnects are constrained: LLN routers typically operate with constraints. LLNs may involve anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-15> by Winter, at al. (Nov. 6, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

In some aspects, a DAG may refer to a directed graph having a property, for example, that all edges are oriented in such a way that no cycles (e.g., loops) exist. All edges may be contained in paths oriented toward and terminating at one or more root nodes (e.g., "clusterheads or "sinks"), often to interconnect the devices of the DAG with a larger infrastructure, such as the Internet, a wide area network, or some other domain. A Destination Oriented DAG (DODAG) may be considered as a DAG rooted at a single destination, e.g., at a single DAG root with no outgoing edges. A "parent" of a particular node within a DAG may refer to an immediate successor of a particular node on a path towards the DAG root, such that the parent can have a lower "rank" than the particular node itself, where the rank of a node can identify the node's position with respect to a DAG root (e.g., the farther away a node is from a root, the higher is the rank of that node). Further, a sibling of a node within a DAG may refer to any neighboring node that is located at the same rank within a DAG. Siblings may not necessarily share a common parent, and routes between siblings generally may not be part of the DAG because there is no forward progress (e.g., their rank is the same). A tree may refer to a kind of DAG, where each device/node in the DAG can have one parent node or, as used herein, one preferred parent node.

DAGs may generally be built based on an Objective Function (OF), for which one role of the Objective Function is generally to specify rules on how to build the DAG (e.g. number of parents, backup parents, etc.). One or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., can be considered as "DAG parameters."

Illustratively, examples of metrics used to select paths (e.g., preferred parents) may include cost, delay, latency, bandwidth, estimated transmission count (ETX), etc., while examples of constraints that may be placed on the route selection may include various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). An example for how routing metrics and constraints may be obtained may be found in an IETF Internet Draft, entitled "Routing Metrics used for Path Calculation in Low Power and Lossy Networks" <draft-ietf-roll-routing-metrics-11> by Vasseur, et al. (Oct. 23, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish a state within the network so that routers know how to forward packets toward their ultimate destination. In some aspects, a "router" may refer to a device that can forward as well as generate traffic, while a "host" may refer to a device that can generate but does not forward traffic. A "leaf" may be used to generally describe a non-router that is connected to the DAG by one or more routers, but cannot itself forward traffic received on the DAG to another router on the DAG. Control messages may be transmitted among the devices within the network for discovery and route dissemination when building the DAG.

According to the illustrative RPL protocol, a DODAG Information Object (DIO) can be a type of DAG discovery message that carries information that allows a node to discover a RPL Instance, learn its configuration parameters, select a DODAG parent set, and maintain the upward routing topology. In addition, a DAO may refer to a type of DAG discovery reply message that conveys destination information upwards along the DODAG so that a DODAG root (and other intermediate nodes) can provision downward routes. A DAO message can include prefix information to identify destinations, a capability to record routes in support of source routing, and information to determine a freshness of a particular advertisement. In some embodiments, "upward" or "up" paths may refer to routes that lead in the direction from leaf nodes towards DAG roots, e.g., following the orientation of the edges within the DAG. Conversely, "downward" or "down" paths may refer to routes that lead in a direction from the DAG roots towards the leaf nodes, e.g., generally going in the opposite direction to the upward messages within the DAG.

Generally, a DAG discovery request (e.g., DIO) message may be transmitted from the root device(s) of the DAG downward toward the leaves, informing each successive receiving device how to reach the root device (that is, from where the request is received is generally the direction of the root). Accordingly, a DAG may be created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining a routing state may aggregate routes from DAO messages that they receive before transmitting the DAO message. Nodes that are not capable of maintaining routing state, however, may attach a next-hop parent address. The DAO message then can be sent directly to the DODAG root that can in turn build the topology and locally compute downward routes to all nodes in the DODAG. Such nodes then can be reachable using source routing techniques over regions of the DAG that are incapable of storing downward routing state.

Figure 3:
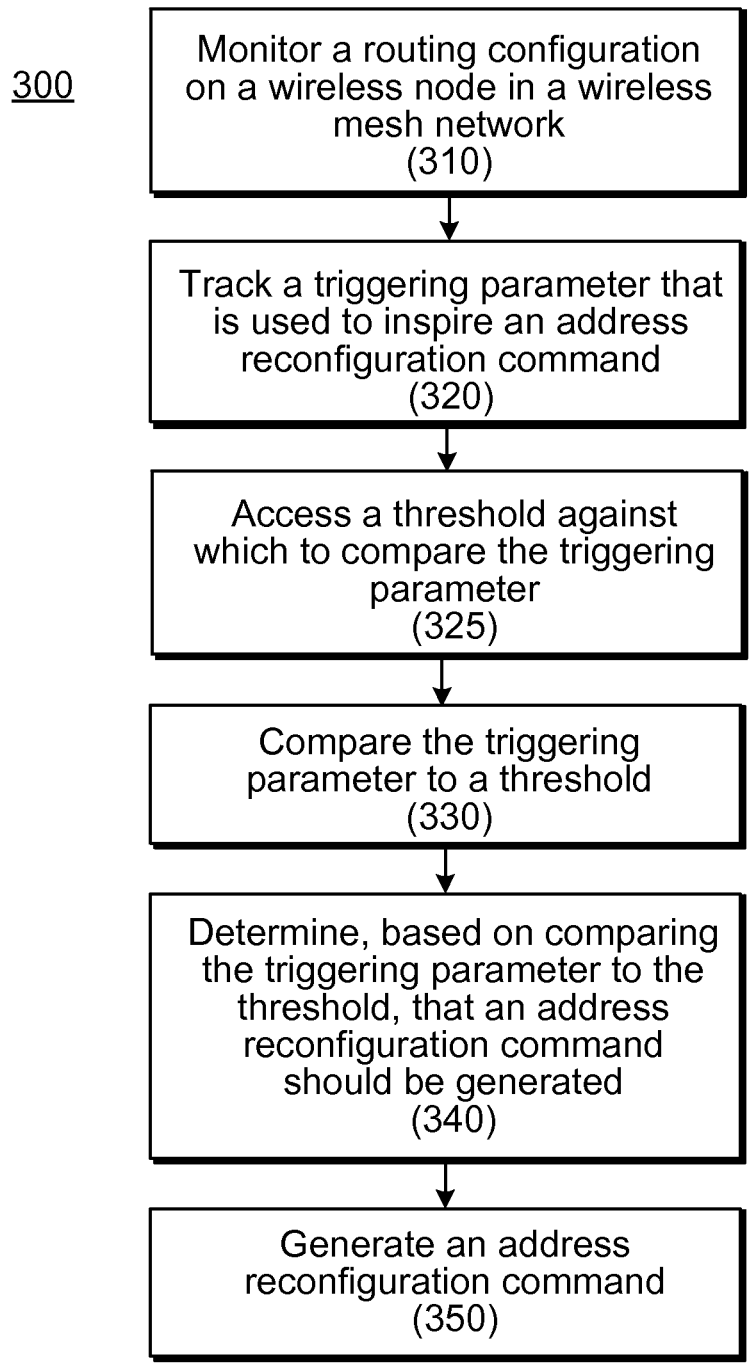
FIG. 3 shows an example of a flow chart of a process for reconfiguring addressing based on network conditions, again described in the context of wireless networking, which is one application setting for this dynamic addressing technology.

FIG. 3 shows a flow chart 300 illustrating a process by which an address reconfiguration command is generated for reconfiguring addressing within the LLN based on network conditions.

Generally, the operations are performed on the wireless node described in FIG. 2. However, the operations may be implemented and performed on other devices in other configurations.

In FIG. 3, a LLN node monitors a routing configuration on a LLN node in a LLN (310). In one implementation, the process of monitoring a routing configuration includes monitoring the size of routing table. In another implementation, the process of monitoring a routing configuration includes monitoring memory utilization, network utilization, and/or address space fragmentation. Each entry in a routing table includes an address or address range. If the addresses lie outside of the address range of the parent, a relatively small number of devices can consume an inordinate amount of available memory because of the number of routes that it must advertise itself to its parent, and because of the inability to perform routing aggregation. Thus, being able to preserve the size of the routing table as well as the number of entries into the table helps to enhance (if not optimize) the operation of the mesh network by freeing up resources (e.g., memory, CPU). These resources can be then utilized for performing other functions such as encryption, error correction, etc.

The routing configuration may vary with its location in the DAG. For example, a LLN node close to the root node may have a larger routing table and/or experience higher resource utilization. In contrast, a wireless node further removed from the root node may have a smaller routing table and process less traffic. Thus, the location of the LLN node in the LLN may be used to determine whether to perform web aggregation. The LLN node tracks a triggering parameter that is used to invoke an address reconfiguration command (320). Tracking the triggering parameter may include inspecting a specified parameter on a specified basis. In one configuration, a LLN node does not track a parameter unless a threshold degree of utilization has occurred. For example, a LLN node that is in power conservation mode may attempt to enter a suspended state between active cycles in order to conserve battery power. During the mode of operation active cycles and the suspended state, the LLN node may avoid generating any alarms until the LLN node detects a minimal degree of activity or utilization. Upon exceeding the minimal degree of utilization, the LLN node may be configured to then track parameters that invoke transmission of the address configuration command. For example, as long as the processor utilization remains below 10%, the LLN node may be configured to not track routing table size. However, upon exceeding 10% processor utilization, the LLN node may be configured to begin tracking routing table size during every active cycle.

The LLN node accesses a threshold against which to compare the triggering parameter (325). Accessing a threshold includes accessing values for parameters that may be used to invoke address reconfiguration. The threshold may include multiple configurations, for example, to account for the ambient state of the network and/or the location of a particular node in a LLN.

The LLN node compares the triggering parameter to the threshold (330). For example, the LLN node may determine if the routing table is larger than a threshold size (e.g., a size of memory of 16 Kbytes). The LLN node also may compare the size of the routing table (in number of entries), the number of child nodes that cannot be aggregated, and the frequency at which DAG aggregation operations are performed.

The LLN node determines, based on comparing the triggering parameter to the threshold, that an address reconfiguration command should be generated (340). In one configuration, the LLN node may only identify a subset of available nodes that should undergo address reconfiguration. For example, the LLN node may attempt to maintain a healthy state by only attempting to aggregate a fractional proportion of the child nodes every time. By performing more gradual updates over a period of time, the impact on performing address reconfiguration may be reduced.

In another configuration, the LLN node may perform address configuration to reduce the size of the memory table below a specified threshold. Thus, the LLN node may be configured to trigger address reconfiguration when the memory utilization exceeds 80% so that the memory utilization drops below 60% (if possible). By dropping to 60% memory utilization, the impact of performing frequent address reconfigurations may be reduced.

The LLN node then invokes an address change of a child node appearing in the routing configuration based on the determination that an address change is appropriate (350). Invoking an address change may include generating an address reconfiguration command, for example, to configure an instruction packet that is sent to a list of neighboring and child devices. The packet may include a suggested prefix to which the child device should consolidate as it assumes a new address (e.g., a new IP address).

Figure 4:
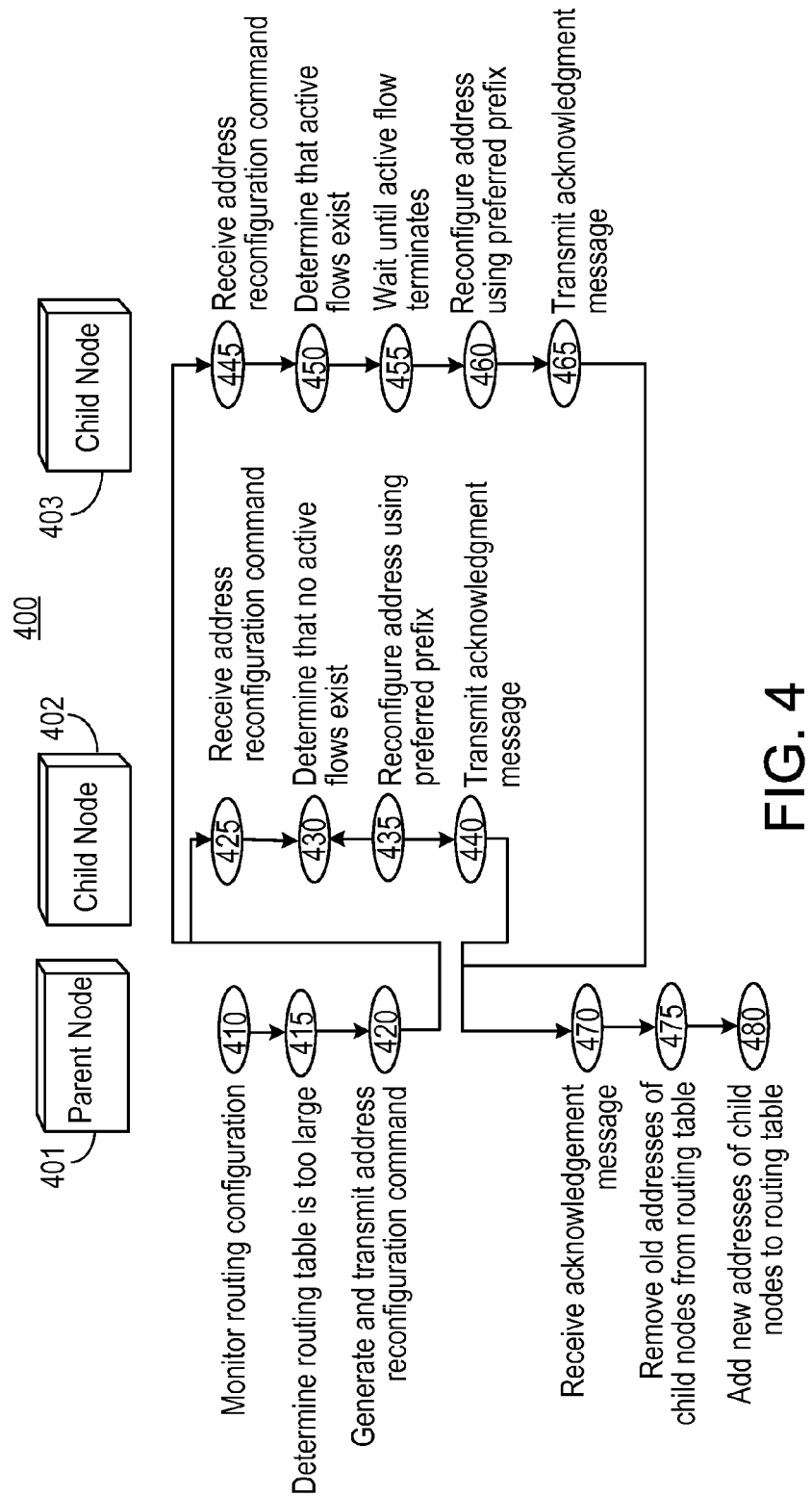
FIG. 4 shows a flow chart exemplifying a process by which a parent node interfaces with a child node to perform an address reconfiguration on a child node so that a parent node may perform routing aggregation on a routing table.

The LLN node then transmits the packets to the child device, which in turn may reconfigure its address as described with respect to FIG. 4.

FIG. 4 shows a flow chart 400 of an example of a process by which a parent node interfaces with a child node to perform an address reconfiguration on a child node so that a parent node may perform routing aggregation on a routing table. The parent node 401 and the child nodes 402 and 403 generally relate to the wireless node of device 200 described previously with respect to FIG. 2. The reference to the wireless node as a parent and/or child node can refer to the relationship of the child node as representing a routing entry in the routing table of the parent node. Generally, the operations shown in flow chart 400 can relate to the operations described in flow chart 300. However, flow chart 400 further illustrates the relationship between a parent node 401 and child nodes 402 and 403 as it is impacted by the existence of an active flow.

Initially, the parent node 401 monitors a routing configuration on a wireless node in a wireless mesh network (410). Monitoring the routing configuration may include monitoring for a routing configuration that is on the verge exceeding a given resource consumption threshold or that is adversely impacting the parent node 401. In one example, the parent node 401 may be monitoring to determine whether the size of the routing table is causing the parent node to consume an undesirable amount of power in managing routing updates. In another example, the parent node 401 may be tracking the number of non-aggregated child nodes (child nodes with individual IP address that lie outside of an aggregated range managed by the parent node that require an individual entry in a routing table of the parent node) and/or the impact of supporting the non-aggregated child nodes on the parent node 401. For example, the parent node 401 may determine the frequency of the routing updates.

The parent node 401 determines that routing table is too large (415). The parent node may be monitoring a number of parameters and determine that one or more of the parameters exceed a specified threshold. In one configuration, determining that the routing table is too large can be performed according to a relative basis, i.e., relative to available memory. In another configuration, determining that the routing table is too large can be performed according to an absolute basis, i.e., determining that the routing table exceeds a particular size.

The parent node 401 generates and transmits an address reconfiguration command (420). Generating and transmitting an address reconfiguration command may include identifying an address prefix and sending a unicast packet addressed to each of the child nodes. Transmitting an address reconfiguration command may include a prioritized setting that indicates the importance of the address reconfiguration command. For example, a parameter at a normal level of priority may indicate that a child node should perform the address reconfiguration if the child node is not engaged in mission critical communications. A parameter at a second level of priority may indicate that a child node should perform the address reconfiguration at the risk of being removed from the DAG. The child node then may determine whether to perform the address reconfiguration.

The child node 402 receives the address reconfiguration command (425). Receiving the address reconfiguration command may include a unicast packet address to the child node 402 indicating that the child node 402 should assume a particular address prefix. The child node 402 then determines that no active flows exist (430). For example, the child node 402 may inspect a communications interface to see that no active communications through the child node 402 have been exchanged in the most recent window of time. Alternatively, the child node 402 may determine that the child node 402 is not actively engaged in a communications session with a remote node, for example, receiving a software update, engaging in a meter reading, or supporting child nodes of the child node 402. Note that the absence of an existing flow is not mandated to perform address reconfiguration.

The child node 402 then reconfigures the prefix using a preferred prefix (435). For example, the child node 402 may transmit a broadcast message to its neighbors that the child node is about to assume the preferred prefix. The neighbors then may update their routing table to reflect the fact that the child node 402 is now using a new address (e.g., a new IP address).

The child node 402 transmits an acknowledgement message (440). Transmitting an acknowledgement message may be used to complete the state transition so that both the parent node 401 and the child node 402 can be confident that the address reconfiguration has been successfully performed. In one configuration, transmitting an acknowledgment message also indicates that children of the child node 402 also have successfully performed the address reconfiguration. Where a child node has been unable to reach particular children, for example, the child node 402 may acknowledge that of the 100 children, all but ADDRESS_A, ADDRESS_B, and ADDRESS_C, have successfully performed the address reconfiguration.

In parallel, the child node 403 receives address reconfiguration command (445). Generally, receiving the address reconfiguration command is similar to the address reconfiguration command described above with respect to child node 402. In some cases, the address reconfiguration command may differ to reflect the underlying differences in the status of the different children. For example, if child node 403 is presently handling a stream of alarm messages, parent node 403 may specify different priorities parameters to give child node 403 a greater threshold of variation in order to continue supporting the stream of alarm messages. The different priorities may be specified in the use of different parameters or the different priorities may be accounted for in different timers with which a device may respond. For example, if child node 403 has more children than child node 402, the parent node 401 may specify different timers that are used with child node 402 and child node 403.

The child node 403 determines that active flows exist (450). In one configuration, determining that an active flow exists includes determining that the child node 403 is an active participant in a communications session. In another configuration, determining that an active flow exists includes determining that the child node 403 is supporting the communications session through its communications interface.

The child node 403 may wait until the active flow terminates (455). For example, the child node may wait for two update cycles to determine whether the communications session has ended, where the update cycle is the period of time for which the parent node 401 is waiting for the child node 403 to respond. The child node 403 also may wait for a window of time to elapse. At the conclusion of the window of time, the child node may determine whether communications have been exchanged in the last cycle.

The child node 403 may determine whether supporting the active flow (or any other event) justifies refusing to perform the address reconfiguration command (not shown). For example, the child node 403 may inspect packets to determine if packets in the active flow represent mission critical communications. If the packets do not represent mission critical communications, the child node 403 may elect to terminate the active flow in order to support the address reconfiguration. Alternatively, the child node 403 may elect to find another parent and maintain the active flow using the newly-found parent.

The child node 403 reconfigures its address using a preferred prefix (460). In addition, the child node 403 also may specify that children (and downstream participants in the active flow) perform the address reconfiguration. The child node 403 then transmits an acknowledgement message (465).

The parent node 401 receives acknowledgement messages from the child node 402 and the child node 403 (470). In one configuration, receiving the acknowledgement message includes receiving a message indicating that the child node and the children of the child node have been updated.

The parent node 401 removes old addresses of child nodes (475). In accordance with yet another specific implementation the parent node may keep for a limited amount of time the old IP address of a given node. A parent may remove an old address either because it received an indication from the old child that it changed its address or because it received an indication from the child that the old address was no longer valid or because the child has refused to reconfigure its address but the parent cannot keep the old address because of lack of resources or other events.

The parent node may serially inspect the routing table and remove those addresses that are no longer valid. The routing table then may be consolidated in memory so as to maximize blocks of available memory without the inefficiencies that result from staggered use of memory.

The parent node 401 then may add new addresses of child nodes to routing table (480). Adding the new addresses may include adding an address range representing an aggregated group of children and an indication that the children are accessible through a particular communications interface.

In one configuration, if a child does not want to assume the suggested prefix, then the parent node experiencing some issues in term of memory consumption (e.g., invoking the change in the IP address) may have to remove the address of the child node to free up some memory for example after the expiration of a configurable timer. The parent node then may inform the child node that although it did not accept to act upon the renumbering request, the parent node had to remove its address, meaning that the child is no longer reachable via this parent node. The child node then may consequently choose another parent.

In one configuration, the address change could be manually triggered. For example, an address reconfiguration command could be generated by a network management operator or in response to a global repair function of RPL.

Although invoking an address change of a child node was describe as invoking the change on at least one node, the address reconfiguration message may be used to manage and invoke changes using a range or a suggested prefix. For example, a node in a LLN invoking an address change in a child may in fact identify a range as an address prefix and transmit the suggested range in an address reconfiguration message transmitted to the child node. The child node then may use the suggested range to manage addresses for the child node and the children of the child node. The disclosed implementations and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of managing a node in a Low power and Lossy Network (LLN), the method comprising:
   receiving, at a node in an LLN and from a parent node in the LLN, a unicast signaling message that includes an address reconfiguration command directing the node to perform an address reconfiguration using a preferred prefix included in the body of the unicast signaling message;
   determining whether there is an active flow on the node;
   based on determining that there is the active flow on the node, activating a delay timer for the node, the delay timer representing a time period by which the node is configured to delay responding to the unicast signaling message pending a resolution of the active flow; and
   responding, by the node, to the address reconfiguration command at the end of the time period based on whether the resolution of the active flow occurred.

2. The method of claim 1, further comprising:
   terminating the active flow upon expiration of the delay timer.

3. The method of claim 2, wherein terminating the active flow upon expiration of the delay timer comprises:
   inspecting packets included in the active flow;
   determining, based on inspecting the packets included in the active flow, that the active flow does not represent mission critical communications; and
   terminating the active flow in response to determining that the active flow does not represent mission critical communications.

4. The method of claim 2, further comprising:
   reconfiguring, in response to terminating the active flow on the node, an address on the node using the preferred prefix; and
   transmitting an acknowledgement message to the parent node indicating that address reconfiguration has been performed.

5. The method of claim 1, further comprising:
   maintaining the active flow upon expiration of the delay timer; and transmitting a response message to the parent node indicating that the address reconfiguration command cannot be supported.

6. The method of claim 1, wherein determining whether there is an active flow on the node includes determining whether the node is an endpoint in a communications session.

7. The method of claim 1, wherein determining whether there is an active flow on the node includes determining that the node is located on a communications path supporting a communications session between two other endpoints.

8. The method of claim 1, further comprising:
   determining that the node is handling a stream of alarm messages; and
   in response to determining that the node is handling the stream of alarm messages, activating a different delay timer for the node that represents a different time period by which the node is configured to delay responding to the unicast signaling message pending a resolution of the stream of alarm messages.

9. A system for managing a node in a Low power and Lossy Network (LLN), the system comprising:
a processor; and
a memory storing instructions that when executed on the processor cause the processor to perform operations comprising:
receiving, at a node in an LLN and from a parent node in the LLN, a unicast signaling message that includes an address reconfiguration command directing the node to perform an address reconfiguration using a preferred prefix included in the body of the unicast signaling message;
determining whether there is an active flow on the node;
based on determining that there is the active flow on the node, activating a delay timer for the node, the delay timer representing a time period by which the node is configured to delay responding to the unicast signaling message pending a resolution of the active flow; and
responding, by the node, to the address reconfiguration command at the end of the time period based on whether the resolution of the active flow occurred.

10. The system of claim 9, wherein the instructions further cause the processor to perform operations comprising:
terminating the active flow upon expiration of the delay timer.

11. The system of claim 10, wherein terminating the active flow upon expiration of the delay timer comprises:
inspecting packets included in the active flow;
determining, based on inspecting the packets included in the active flow, that the active flow does not represent mission critical communications; and
terminating the active flow in response to determining that the active flow does not represent mission critical communications.

12. The system of claim 10, wherein the instructions further cause the processor to perform operations comprising:
reconfiguring, in response to terminating the active flow on the node, an address on the node using the preferred prefix; and
transmitting an acknowledgement message to the parent node indicating that address reconfiguration has been performed.

13. The system of claim 9, wherein the instructions further cause the processor to perform operations comprising:
maintaining the active flow upon expiration of the delay timer; and
transmitting a response message to the parent node indicating that the address reconfiguration command cannot be supported.

14. The system of claim 9, wherein determining whether there is an active flow on the node includes determining whether the node is an endpoint in a communications session.

15. The system of claim 9, wherein determining whether there is an active flow on the node includes determining that the node is located on a communications path supporting a communications session between two other endpoints.

16. The system of claim 9, wherein the instructions further cause the processor to perform operations comprising:
determining that the node is handling a stream of alarm messages; and
in response to determining that the node is handling the stream of alarm messages, activating a different delay timer for the node that represents a different time period by which the node is configured to delay responding to the unicast signaling message pending a resolution of the stream of alarm messages.

17. A tangible, non-transitory computer readable medium for managing a node in a Low power and Lossy Network (LLN), the computer readable medium including instructions that when executed on a processor cause the processor to perform operations comprising:
receiving, at a node in an LLN and from a parent node in the LLN, a unicast signaling message that includes an address reconfiguration command directing the node to perform an address reconfiguration using a preferred prefix included in the body of the unicast signaling message;
determining whether there is an active flow on the node;
based on determining that there is an active flow on the node, activating a delay timer for the node, the delay timer representing a time period by which the node is configured to delay responding to the unicast signaling message pending a resolution of the active flow; and
responding, by the node, to the address reconfiguration command at the end of the time period based on whether the resolution of the active flow occurred.

18. The tangible, non-transitory computer readable medium of claim 17, wherein the instructions cause the processor to further perform operations comprising:
terminating the active flow upon expiration of the delay timer.

19. The tangible, non-transitory computer readable medium of claim 18, wherein terminating the active flow upon expiration of the delay timer comprises:
inspecting packets included in the active flow;
determining, based on inspecting the packets included in the active flow, that the active flow does not represent mission critical communications; and
terminating the active flow in response to determining that the active flow does not represent mission critical communications.

20. The tangible, non-transitory computer readable medium of claim 18, wherein the instructions cause the processor to further perform operations comprising:
reconfiguring, in response to terminating the active flow on the node, an address on the node using the preferred prefix; and
transmitting an acknowledgement message to the parent node indicating that address reconfiguration has been performed.

21. The tangible, non-transitory computer readable medium of claim 17, wherein the instructions cause the processor to further perform operations comprising:
maintaining the active flow upon expiration of the delay timer; and
transmitting a response message to the parent node indicating that the address reconfiguration command cannot be supported.

22. The tangible, non-transitory computer readable medium of claim 17, wherein determining whether there is an active flow on the node includes determining whether the node is an endpoint in a communications session.

23. The tangible, non-transitory computer readable medium of claim 17, wherein determining whether there is an active flow on the node includes determining that the node is located on a communications path supporting a communications session between two other endpoints.

24. The tangible, non-transitory computer readable medium of claim 17, wherein the instructions cause the processor to further perform operations comprising:
determining that the node is handling a stream of alarm messages; and in response to determining that the node is handling the stream of alarm messages, activating a different delay timer for the node that represents a different time period by which the node is configured to delay responding to the unicast signaling message pending a resolution of the stream of alarm messages.

\* \* \* \* \*